(12) United States Patent
Balasubramanian

(10) Patent No.: US 7,272,687 B2
(45) Date of Patent: Sep. 18, 2007

(54) CACHE REDUNDANCY FOR LSI RAID CONTROLLERS

(75) Inventor: Sridhar Balasubramanian, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 423 days.

(21) Appl. No.: 11/049,002

(22) Filed: Feb. 1, 2005

(65) Prior Publication Data

US 2006/0174156 A1    Aug. 3, 2006

(51) Int. Cl.
*G06F 12/00* (2006.01)
(52) U.S. Cl. ...................................... 711/114
(58) Field of Classification Search ...................... None
See application file for complete search history.

(56) References Cited

U.S. PATENT DOCUMENTS

| | | | |
|---|---|---|---|
| 7,020,770 B2 * | 3/2006 | Smith et al. .................... | 713/1 |
| 2004/0010680 A1 * | 1/2004 | Smith et al. .................... | 713/1 |
| 2005/0010715 A1 * | 1/2005 | Davies et al. ................ | 711/100 |

* cited by examiner

*Primary Examiner*—Kevin Verbrugge
(74) *Attorney, Agent, or Firm*—Cochran Freund & Young LLC

(57) ABSTRACT

Disclosed is a 2-level cache system for a Redundant Array of Independent Disks (RAID) device used as part of a Storage Area Network (SAN) system. The RAID controller of the RAID device contains a level 1 cache contained in the RAID controller RAM, and a level 2 cache is created in a Log-structured File System (LFS) portion of a local hard disk drive of the RAID device. The 2-level cache system provides increased data integrity and reliability, as well as less fragmentation of the data frame, for communications with remote storage devices in a SAN system. The increased performance is due to data caching being done at the RAM and disk level instead of data being sent directly to the transmit buffer. The 2-level cache system delays data transmissions until there is system idle time, thus, providing efficient bandwidth utilization of SAN communications, as well as improved resource allocation at the RAID controller level. The 2-level cache system can avoid transmissions across the SAN communication link, thus, freeing RAID controller resources for other purposes when the data frames do not need to be transmitted. The level 2 cache on the log-structured file system disk records a timestamp of each entry in the level 2 cache, making data recovery after a system malfunction faster and easier.

20 Claims, 8 Drawing Sheets

CACHE REDUNDANCY FOR LSI RAID CONTROLLERS

BACKGROUND OF THE INVENTION a. Field of the Invention

The present invention generally pertains to storage systems and more particularly to Redundant Array of Independent Disks (RAID) data storage systems as part of a Storage Area Network (SAN) system.

b. Description of the Background

A Redundant Array of Independent Disks (RAID) data storage system is a method of using multiple physical hard drives to act as a single logical hard drive for interaction with one or more host computers. A RAID storage device consists of an array of one or more hard disk drives controlled by a RAID controller. The RAID controller handles communication with external devices and coordination of the array operation for each of the individual hard disk drives. RAID systems are often used in mission critical jobs due to their flexibility in providing fast data access and hard disk drive fault tolerance.

A Storage Area Network (SAN) is a separate network for the special purpose of interconnecting multiple storage devices for use by one or more host data server computers. A SAN interconnects storage related resources and can be used to centralize data storage, thus providing a single addressing interface for multiple storage devices reducing the management costs and complexity of the data server computer environment. A SAN can incorporate many different types of data storage devices including Network-Attached Storage (NAS) devices and Direct-Attached Storage (DAS) devices. A NAS device is a standalone storage device, such as a RAID device, that connects directly to a Local Area Network (LAN) or Wide Area Network (WAN). A NAS device can be connected directly to the SAN system or incorporated as a sub-network of the SAN system. DAS devices, such as a Small Computer System Interface (SCSI) RAID device connected directly to a host computer data server. The SCSI connection between the RAID device and the host computer data server may be utilized as the SAN connection for the host computer data server. NAS devices typically support Internet Protocols (IP), such as the Transmission Control Protocol (TCP) and the User Datagram Protocol (UDP) over Ethernet and other physical networking media. DAS devices typically support SCSI and Integrated Drive Electronics/Advanced Technology Attachment (IDE/ATA) communication protocols. A SCSI connection can be used to tie multiple storage devices into a SAN system with or without a direct connection to a host computer data server.

Fibre Channel (FC) is a newer technology protocol for storage devices, and is particularly suited to SAN systems. Fibre Channel is beginning to replace SCSI as the transmission interface between clustered data storage devices and host computer data servers. Fibre Channel is more flexible than SCSI and can be used with multiple physical media including optical fiber, ordinary telephone wire, coaxial cable, and other common networking physical media. In addition, Fibre Channel is designed to interoperate with SCSI, Internet Protocol (IP), and other protocols, giving direct connectivity to a wide variety of storage devices through the Fibre Channel connection. Information on the Fibre Channel protocol, and most other communication protocols, is kept by the American National Standards Institute (ANSI). ANSI is located at 11 West 42nd Street, 13th Floor, New York, N.Y. 10036, telephone number 212-642-4900, and web site www.ansi.org.

A Log-structured File System (LFS) writes all modifications to disk sequentially in a log-like structure, speeding up both file writing and crash recovery. A traditional file system lays out files near each other once on the disk drive. Thereafter, the files are rewritten over the original blocks whenever a change is made. In contrast, a log-structured file system always writes data blocks sequentially, so the write process always writes data that is next to each other on the disk drive without any intervening head seeks. The log is the only structure on the disk. The log contains indexing information so that files can be read back from the log efficiently.

SUMMARY OF THE INVENTION

The present invention overcomes the disadvantages and limitations of the prior art by providing a 2-level cache system for a Redundant Array of Independent Disks (RAID) device used as part of a Storage Area Network (SAN) system.

An embodiment of the present invention may therefore comprise a method for buffering storage area network communications in a RAID controller to increase overall data reliability, integrity, and communication efficiency for a storage area network system comprising the steps of: accepting written data, the written data being small data fragments sent to the RAID controller as write requests, the write requests being a part of the storage area network communications; storing the written data in a RAM level 1 cache, the RAM level 1 cache being a RAM level 1 data structure contained in random access memory of the RAID controller; coalescing the written data in order to create larger written data blocks as the written data is sent to the RAID controller; and sequentially storing the written data blocks to a LFS disk level 2 cache when each of the written data blocks in the RAM level 1 cache is full, the LFS disk level 2 cache being a LFS disk level 2 data structure stored on a portion of a local hard disk drive associated with the RAID controller, the portion of the local hard disk drive formatted in log-structured file system format.

An embodiment of the present invention may further comprise a RAID controller device that buffers storage area network communications to increase overall data reliability, integrity, and communication efficiency for a storage area network system comprising: a storage area network communications port that sends and receives the storage area network communications, including write requests, the write requests contain written data, the written data being small data fragments; a RAM level 1 cache that stores the written data, the RAM level 1 cache being a RAM level 1 data structure contained in random access memory of the RAID controller; a data coalescing process that coalesces the written data into larger written data blocks as the written data is sent to the RAID controller; and a LFS disk level 2 cache that sequentially stores the written data blocks as the RAID controller determines the written data blocks should be stored to the LFS disk level 2 cache, the LFS disk level 2 cache being a LFS disk level 2 data structure stored on a portion of a local hard disk drive associated with the RAID controller, the portion of the local hard disk drive formatted in log-structured file system format.

DETAILED DESCRIPTION OF THE INVENTION

Figure 1:
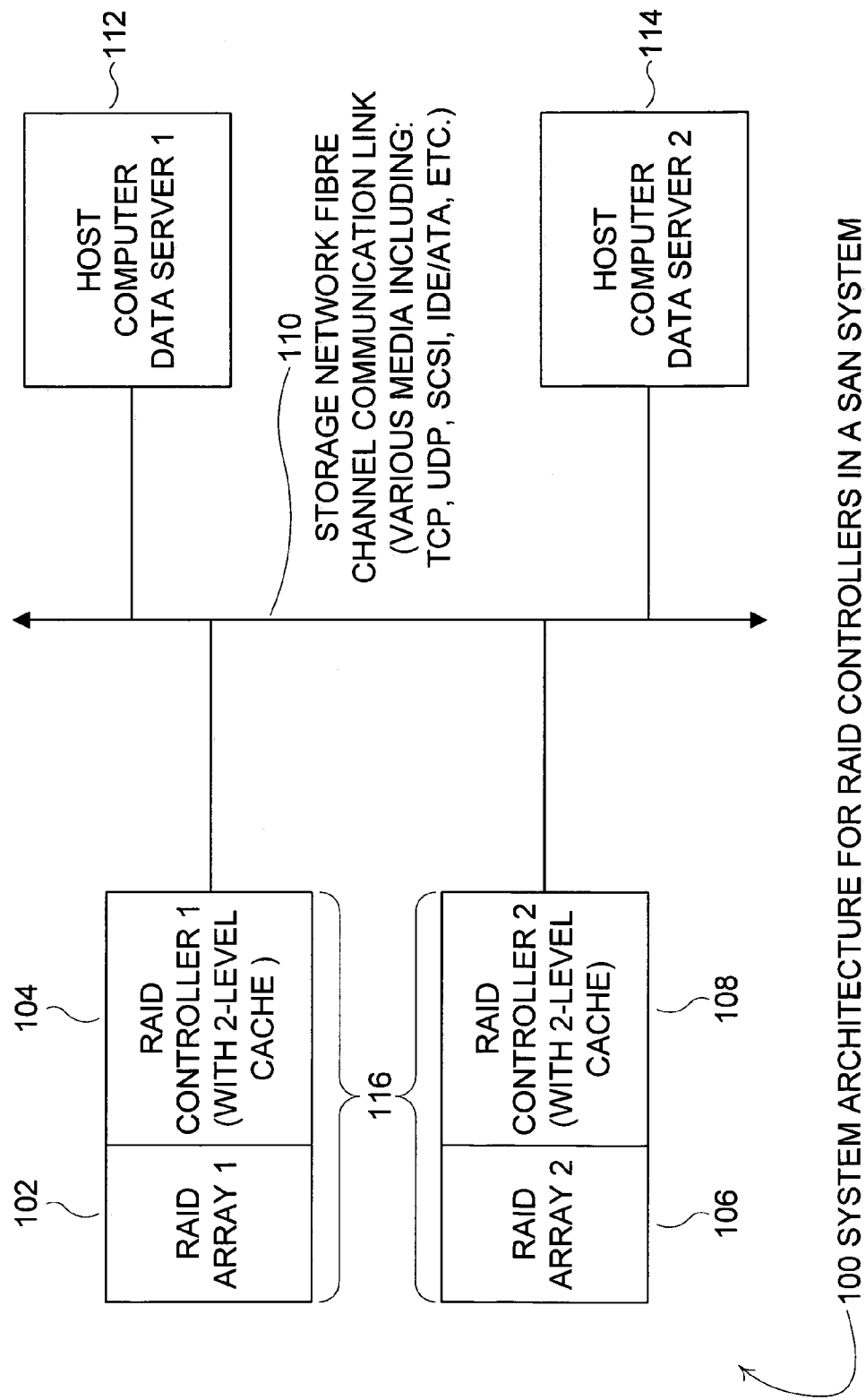
FIG. 1 is a schematic illustration of the system architecture for a Storage Area Network (SAN) system including RAID devices utilizing an embodiment of the 2-level cache system.

FIG. 1 is a schematic illustration of the system architecture (100) for a Storage Area Network (SAN) system including RAID devices (116) utilizing an embodiment of the 2-level cache system. In a SAN system (100) there are data storage devices (116) connected together to provide data storage capabilities for one or more host computer data servers (112, 114). The data storage devices (116) and the host computer data servers (112, 114) are connected to the SAN system using the storage network communication link (110). In the embodiment shown in FIG. 1, the data storage devices are RAID devices (116) which implement an embodiment of a 2-level cache system, and the storage network communication link (110) is implemented using Fibre Channel (FC) technology. The storage network communication link (110) is capable of using a variety of communication technologies individually or in combination. The various physical communication media and communication protocols permitted for the storage network communication link (110) include, but are not limited to: Internet Protocol (IP), Transmission Control Protocol (TCP), User Datagram Protocol (UDP), Small Computer System Interface (SCSI), and Independent Drive Electronics/Advanced Technology Attachment (IDE/ATA). The SAN system (100) can be connected using both Local Area Network (LAN) and Wide Area Network (WAN) technologies. Data storage devices (116) may connect to the SAN system (100) using SAN technology, or the data storage devices (116) may connect to the SAN system (100) using Network-Attached Storage (NAS) or Direct-Attached Storage (DAS) technologies. The two RAID devices (116) shown in FIG. 1 consist of a RAID array of hard disk drives (102, 106) coupled with a RAID controller (104, 108). The RAID controllers (104, 108) both implement an embodiment of the 2-level cache system to improve system performance.

Figure 2:
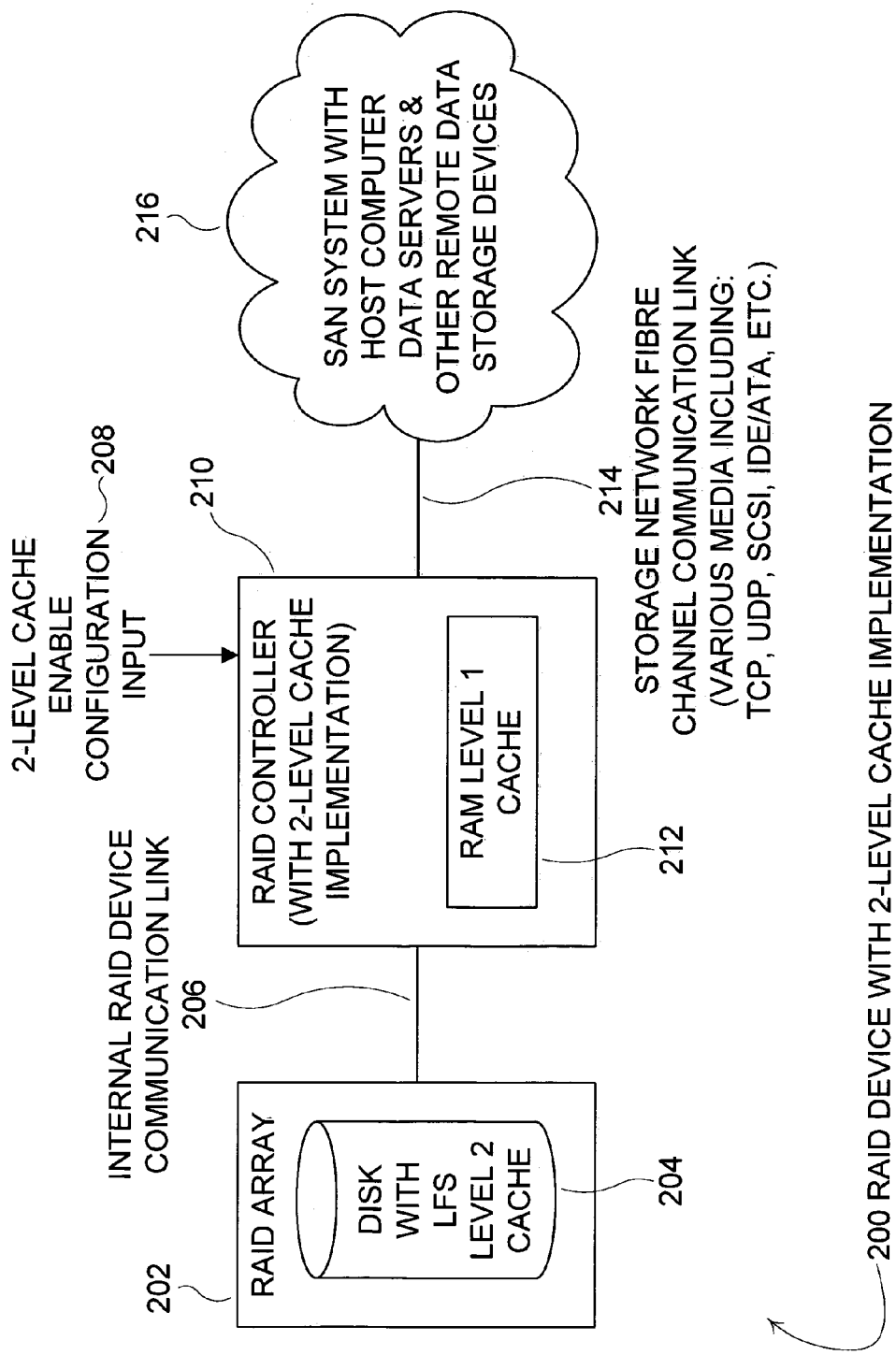
FIG. 2 is a schematic illustration of a RAID device utilizing an embodiment of the 2-level cache system.

FIG. 2 is a schematic illustration of a RAID device (200) utilizing an embodiment of the 2-level cache system. The RAID device (200) consists of a RAID array of hard disk drives (202) and a RAID controller device (210). The RAID controller (210) contains Random Access Memory (RAM) for use in managing and controlling communications with the RAID device (200) as well as for controlling the RAID array of disks (202). The 2-level cache system designates a portion of the RAID controller (210) RAM for use as a level 1 cache (212). Many times the RAM used on a RAID controller (210) is actually Non-Volatile Static RAM (NVS-RAM) which permits the RAID controller (210) to maintain memory values through power cycles of the RAID device (200). The RAM level 1 cache (212) has a memory architecture to facilitate buffering SAN system (216) write commands and passing buffered data to a level 2 cache held on a RAID array (202) hard disk drive (204). The RAM level 1 cache (212) memory architecture is disclosed in more detail in the description of the embodiment with respect to FIG. 3. The RAID controller (210) communicates with the SAN system (216) using the storage network communication link (214). The storage network communication link (214) is typically implemented using Fibre Channel technology. Fibre Channel technology is built to interoperate with various communication technologies including, but not limited to: IP, TCP, UDP, SCSI, IDE/ATA, LAN, and WAN technologies. A typical embodiment of a RAID device (200) with 2-level cache functionality would include a 2-level cache enable configuration input (208) to turn the 2-level cache features of the RAID device (200) on and off.

The RAID device (200) has a local RAID array of hard disk drives (202). The RAID controller (210) communicates with the RAID array (202) using an internal RAID device communication link (206). The internal RAID communication link (206) is normally a proprietary communication protocol specific to the RAID device (200). The RAID device (200) implements the level 2 cache (204) using a portion of a local hard disk drive (204) of the RAID array (202). The level 2 cache portion of the local hard disk drive (204) is formatted using a Log-structured File System (LFS). The log-structured file system permits the LFS disk level 2 cache (204) to write large blocks of data received from the RAM level 1 cache (212) more efficiently than a traditional random access file system. The log-structured file system also tracks the time that data is written to the LFS disk level 2 cache (204) permitting faster and easier data recovery in the case of a system malfunction. The data blocks of the log-structured file system local hard disk (204) have a data architecture to facilitate simple and fast data transfers between the LFS disk level 2 cache (204) and the RAM level 1 cache (212). The data structure of the LFS level 2 cache (204) is disclosed in more detail in the description of the embodiment with respect to FIG. 4.

As the demands on RAID device (210) resources permit, data buffered in the RAM level 1 cache (212) is copied to the LFS Disk level 2 cache (204). The buffered data is redundantly stored in both RAM level 1 cache (212) and LFS disk level 2 cache (204) until the RAM level 1 cache (212) is flushed. To optimize performance, a Least Recently Used (LRU) algorithm may be used to determine which data to keep in the relatively faster RAM level 1 cache (212), and which data to transfer to the relatively slower LFS disk level 2 cache (204). The same least recently used algorithm may be used to determine which data to keep in the relatively faster access LFS disk level 2 cache (204) as opposed to sending the data to the relatively slower access final remote storage device on the SAN system (216). The process of flushing the cache is the operation used to transfer, not copy, the buffered data to the next level of data storage. A level 1 flush would transfer buffered data from the RAM level 1 cache (212) to the LFS disk level 2 cache (204). A level 2 flush would transfer stored data form the LFS disk level 2 cache (204) to remote data storage devices on the SAN system (216).

Figure 3:
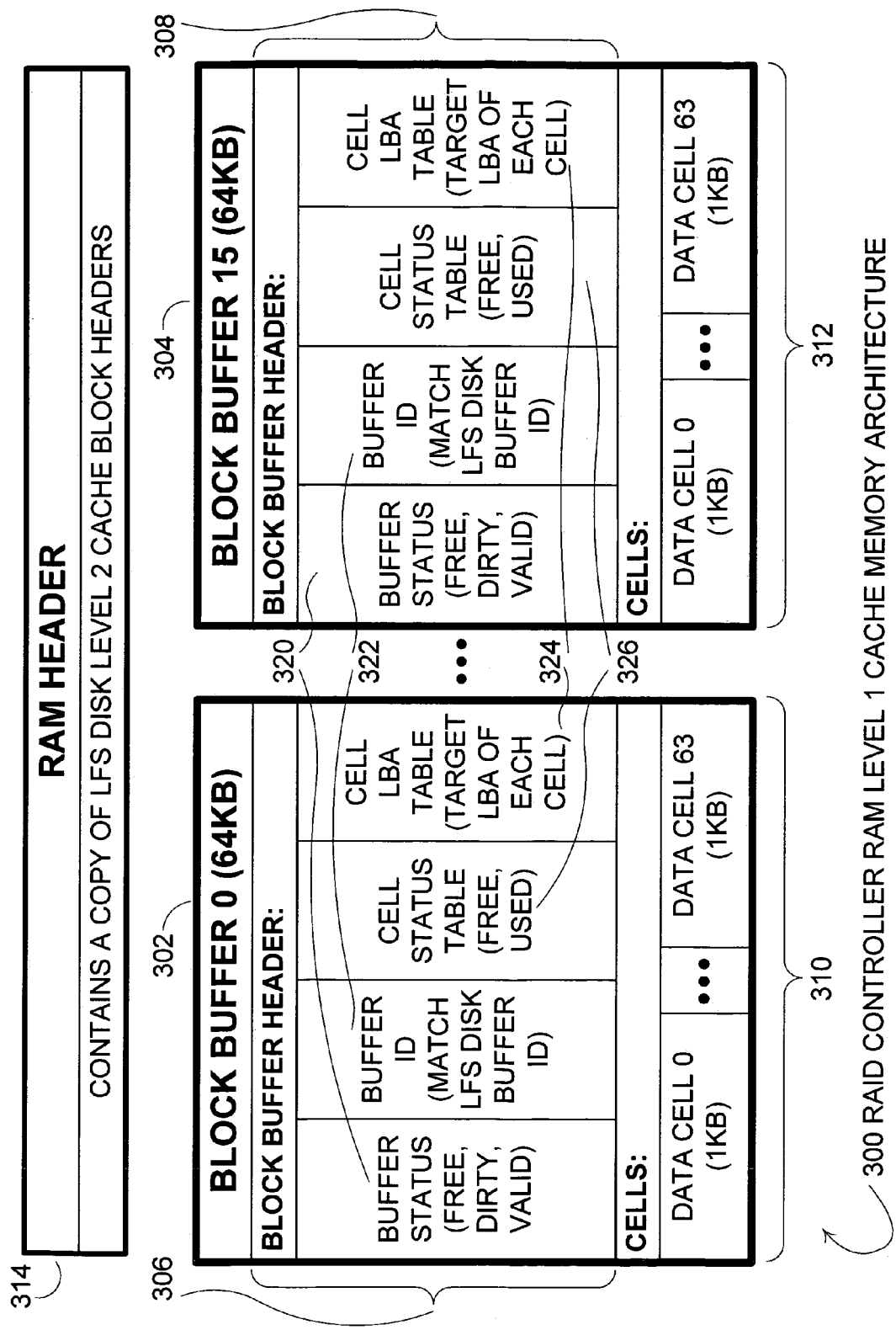
FIG. 3 is a schematic illustration of the Random Access Memory (RAM) architecture for a RAM level 1 cache of an embodiment of a RAID controller with a 2-level cache system.

FIG. 3 is a schematic illustration of the Random Access Memory (RAM) architecture (300) for a RAM level 1 cache of an embodiment of a RAID device with a 2-level cache system. The RAM level 1 cache has a RAM header (314) that contains a copy of the block header (406, 408) of all blocks (402, 404) in the LFS disk level 2 cache. The structure of the LFS disk level 2 cache is disclosed in more detail in the description of the embodiment with respect to FIG. 4. The RAM level 1 cache also contains at least one block buffer data structure (302, 304). The embodiment shown in FIG. 3 contains sixteen instances of the block buffer data structure (302, 304). The block buffer data structure (302, 304) is made up of a block buffer header (306, 308) and at least one data cell (310, 312). The size and number of data cells (310, 312) must match the number of data cells (410, 412) in the block structure (402, 404) of the LFS disk level 2 cache. The structure of the LFS disk level 2 cache is disclosed in more detail in the description of the embodiment with respect to FIG. 4. The embodiment shown in FIG. 3 has sixty-four data cells (310, 312) per block buffer (302, 304). Each data cell (310, 312) contains data obtained from a write request. The write request and data cell are associated via the target Logical Block Address (LBA) of the write request and the cell LBA lookup table (324) of the block buffer header (306, 308).

The block buffer header (306, 308) consists of a block buffer status (320), a buffer identification number (322), a cell status lookup table (326), and a cell LBA lookup table (324). The block buffer status (320) stores the status of whether data stored in the block buffer (302, 304) has been copied to the LFS disk level 2 cache. A block buffer status (320) of "Free" indicates that the block buffer (302, 304) is empty and that there is no buffered data to transfer to the LFS disk level 2 cache. A block buffer status (320) of "Dirty" indicates that data has been written to the block buffer (302, 304) that has not been copied to the LFS disk level 2 cache. A block buffer status (320) of "Valid" indicates that data buffered in the block buffer (302, 304) has been copied to the LFS disk level 2 cache. The buffer identification number (322) identifies an instance of the block buffer data structure (302, 304). The buffer identification number (322) is also used to pair a block buffer (302, 304) in RAM level 1 cache with a block (402, 404) in LFS disk level 2 cache by writing the block buffer identification number (322) to the appropriate location in the copy of LFS disk level 2 block headers (406, 408) contained in the RAM header (314). The block data structure of the LFS disk level 2 cache is disclosed in more detail in the discussion with respect to FIG. 4. The cell status lookup table (326) contains the availability status for each data cell (310, 312) of the block buffer (306, 308). A cell status value (326) of "Free" indicates that the associated data cell (310, 312) is empty and can be used to buffer incoming data. A cell status value (326) of "Used" indicates that the associated data cell (310, 312) contains data associated with a LBA from a previous write request. Only data written to the same LBA as the LBA associated with the data cell (310, 312) may be written to a "Used" data cell (310, 312). The cell LBA lookup table (324) contains the LBA for the data stored in each data cell (310, 312).

Figure 4:
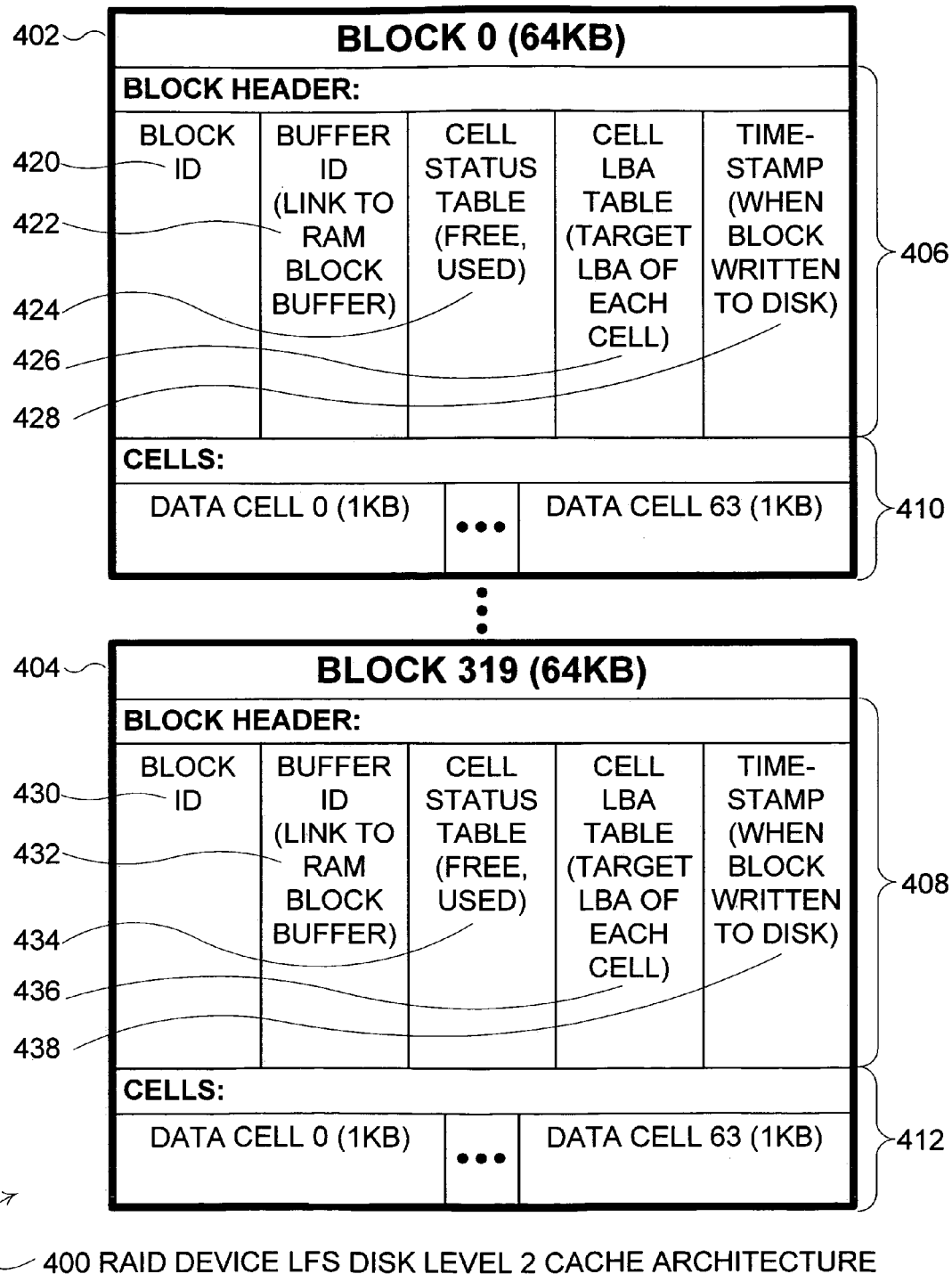
FIG. 4 is schematic illustration of the Log-structured File System (LFS) hard disk drive architecture for a LFS disk level 2 cache of an embodiment of a RAID device with a 2-level cache system.

FIG. 4 is schematic illustration of the Log-structured File System (LFS) hard disk drive architecture (400) for a LFS disk level 2 cache of an embodiment of a RAID device with a 2-level cache system. The LFS disk level 2 cache contains at least one block data structure (402, 404). The embodiment shown in FIG. 4 contains three hundred twenty instances of the block data structure (402, 404). The block data structure (402, 404) is made up of a block header (406, 408) and at least one data cell (410, 412). The size and number of data cells (410, 412) are preset configurable values. The embodiment shown in FIG. 4 has sixty-four data cells (410, 412) per block (302, 304). Each data cell (410, 412) contains data obtained from a write request and passed down to the LFS disk level 2 cache from the RAM level 1 cache. The write request and data cell are associated via the target Logical Block Address (LBA) of the write request and the cell LBA lookup table (424, 434) of the block header (406, 408).

The block header (406, 408) consists of a block identification number (420, 430), a buffer identification number (422, 432), a cell status lookup table (426, 436), a cell LBA lookup table (424, 434), and a last written timestamp (428, 438). The block identification number (420, 430) identifies an instance of the block data structure (402, 404). The buffer identification number (422, 432) is used to pair a block (402, 404) in LFS disk level 2 cache with a block buffer (302, 304) in RAM level 1 cache. The block buffer data structure of the RAM level 1 cache is disclosed in more detail in the discussion with respect to FIG. 3. The cell status lookup table (426, 436) contains the availability status for each data cell (410, 412) of the block (406, 408). A cell status value (426, 436) of "Free" indicates that the associated data cell (410, 412) is empty and can be used to store incoming data. A cell status value (426, 436) of "Used" indicates that the associated data cell (410, 412) contains data associated with a LBA from a previous write request. Only data written to the same LBA as the LBA associated with the data cell (410, 412) may be written to a "Used" data cell (410, 412). The cell LBA lookup table (424, 434) contains the LBA for the data stored in each data cell (410, 412). The last written timestamp value (428, 438) holds the time that data was last written to the block (402, 404).

Figure 5:
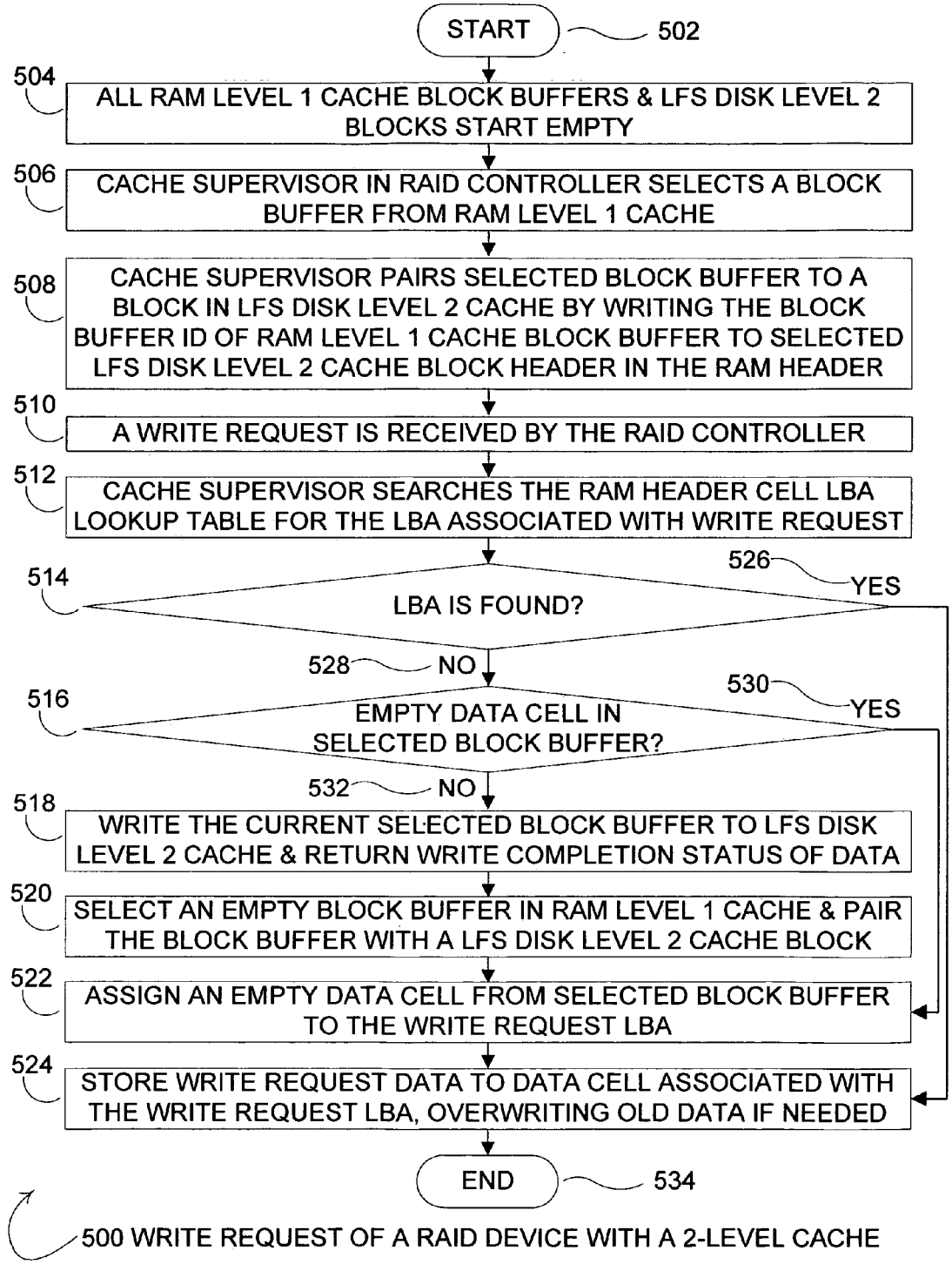
FIG. 5 is a flowchart describing the process for handling a write request for an embodiment of a RAID device with a 2-level cache system.

FIG. 5 is a flowchart (500) describing the process for handling a write request for an embodiment of a RAID device with a 2-level cache system. To start (502), all RAM level 1 cache block buffers and LFS disk level 2 blocks are empty (504). The cache supervisor in the RAID controller then selects a block buffer from the RAM level 1 cache (506). Once a block buffer is selected (506), the cache supervisor pairs the selected block buffer in RAM level 1 cache with a block in the LFS disk level 2 cache by writing the block buffer identification number of the selected RAM level 1 cache block buffer into the selected LFS disk level 2 cache block header in the RAM level 1 cache RAM header (508). The RAID controller then detects and accepts a write request for the SAN system (510). With the write request, the cache supervisor searches the RAM level 1 cache RAM header cell LBA lookup table for the LBA associated with the current write request (512). It is then determined if the LBA was found in the RAM header cell LBA lookup table (514). If the LBA was found (526) in the cell LBA lookup table, the process skips to step 524 and overwrites the data in the data cell with the data from the current write request (524). If the LBA was not found (528) in the cell LBA lookup table, it is then determined if there is an empty data cell in the selected block buffer (516). If there is an empty data cell in the selected block buffer (530), then the process skips to step 522 and assigns the empty data cell to the write request LBA (522) and stores the write request data in the empty data cell (524). If there is not an empty data cell in the selected block buffer (532), then all of the data in the currently selected block buffer is written to a block in the LFS disk level 2 cache and the cache supervisor returns the write completion status for all write requests whose data was stored in the selected block buffer (518). Data written to the LFS disk level 2 cache is written sequentially so that the disk drive avoids unnecessary seek operations. Also, the data written to the LFS disk level 2 cache has been coalesced into a much larger chunk than the original fragmentary data associated with the individual write requests. Once the data from the selected block buffer has been written to the LFS disk level 2 cache (518), an empty block buffer from the RAM level 1 cache is selected and paired with a LFS disk level 2 cache block (520). The pairing of the level 1 block buffer and the level 2 block is accomplished in the same manner as in step 508. An empty data cell in the newly selected empty block buffer is then assigned to the write request LBA (522). The write request data is then written into the data cell associated with the write request LBA (524). The write request process is then ended (534), and the system is ready to receive another write request.

Figure 6:
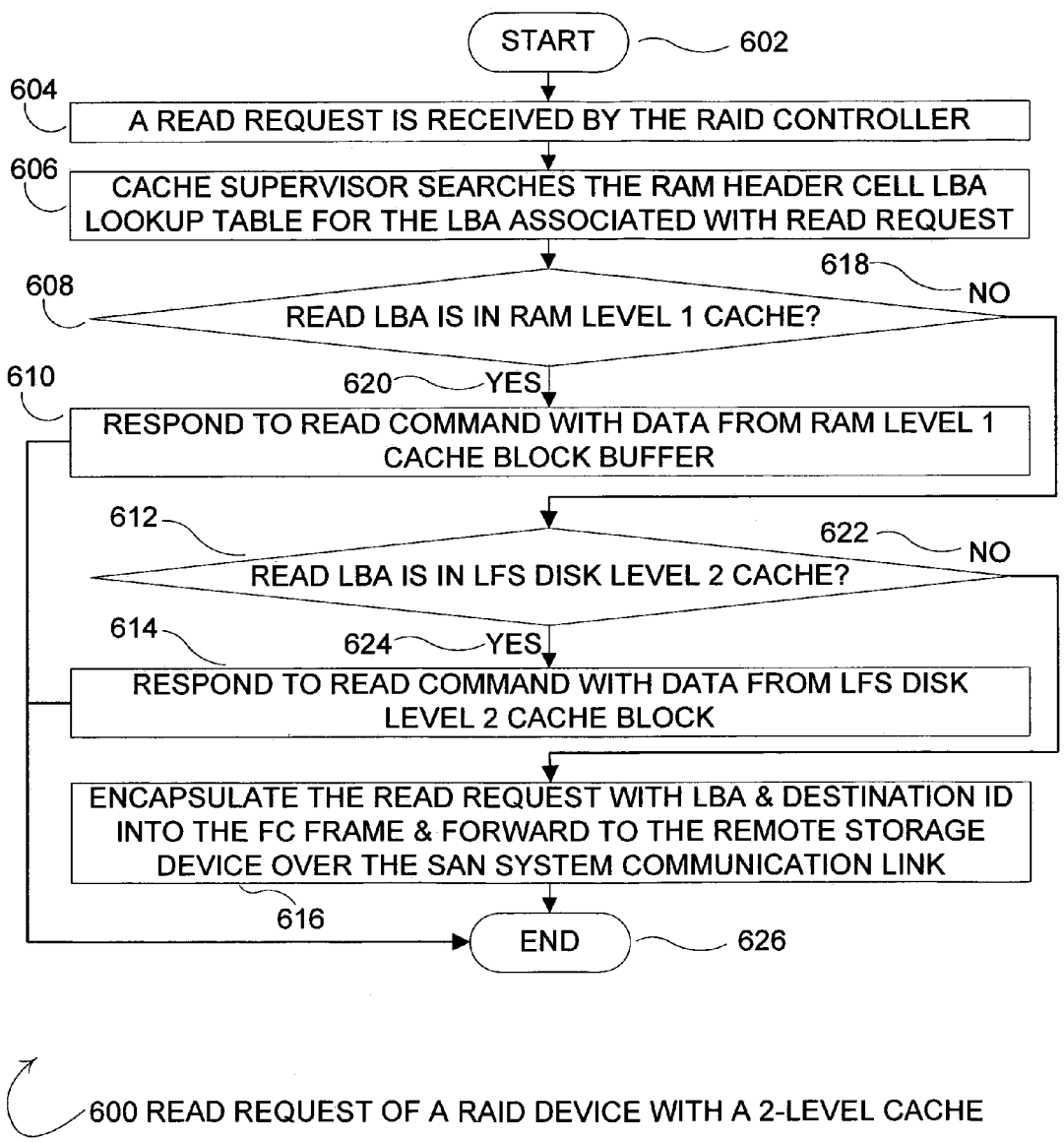
FIG. 6 is a flowchart describing the process for handling a read request for an embodiment of a RAID device with a 2-level cache system.

FIG. 6 is a flowchart (600) describing the process for handling a read request for an embodiment of a RAID device with a 2-level cache system. The read request process starts (602) when the RAID controller receives a read request command from the SAN system (604). The cache supervisor of the RAID controller then searches the RAM level 1 cache RAM header cell LBA lookup table for the LBA associated with the read request (606). It is then determined if the write request LBA is associated with a data cell in the RAM level 1 cache (608). If the read request LBA is associated with a data cell in the RAM level 1 cache (620), then the RAID controller responds to the read request with the data stored in the RAM level 1 cache data cell associated with the read request LBA (610). If the read request LBA is not found in the RAM level 1 cache (618), then it is determined whether the read request LBA is associated with a data cell in the LFS disk level 2 cache (612). If the read request LBA is associated with a data cell in the LFS disk level 2 cache (624), then the RAID controller responds to the read request with the data stored in the LFS disk level 2 cache data cell associated with the read request LBA (614). If the read request LBA is not associated with a data cell in either the RAM level 1 cache or the LFS disk level 2 cache, then the RAID controller encapsulates the read request with the read request LBA and a storage device destination identification value and puts the data into a Fibre Channel frame and forwards the read request to the remote storage device over the SAN system communication link (616). The read request process is, thus, ended (626).

Figure 7:
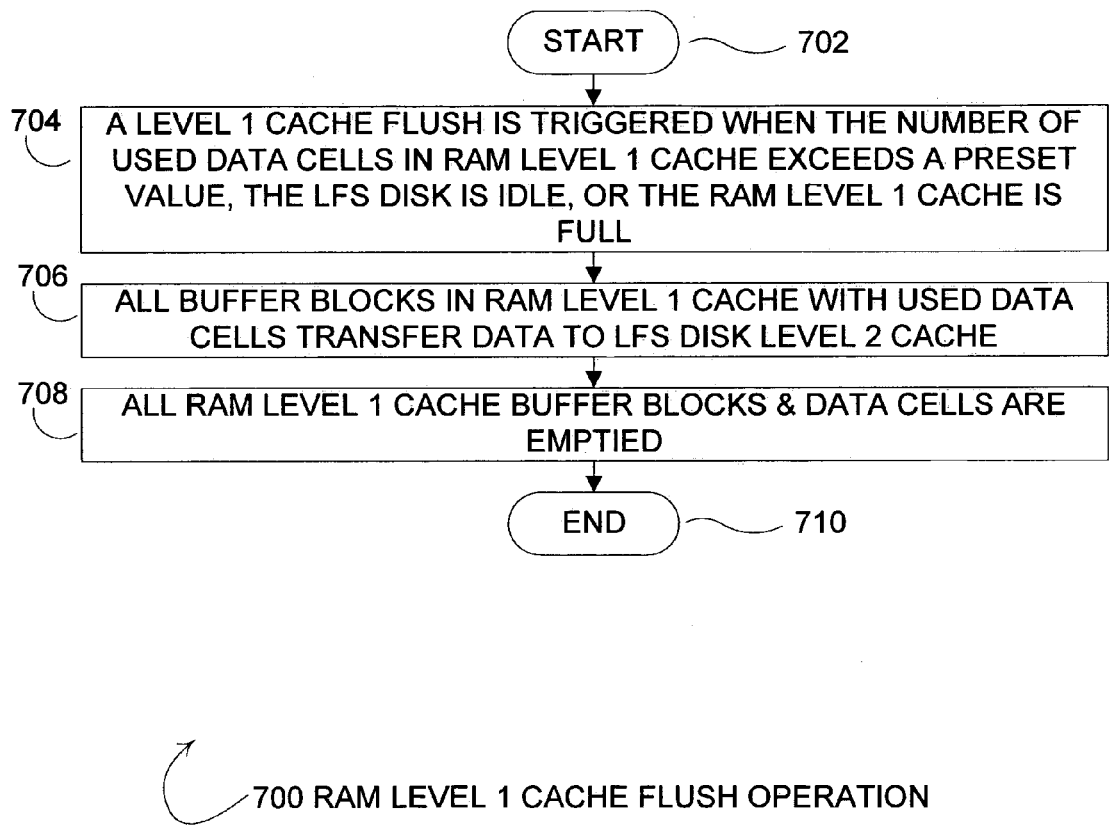
FIG. 7 is a flowchart describing the process for a level 1 flush of RAM level 1 cache for an embodiment of a RAID device with a 2-level cache system.

FIG. 7 is a flowchart 700 describing the process for a level 1 flush of RAM level 1 cache for an embodiment of a RAID device with a 2-level cache system. To start (702), a level 1 cache flush is triggered by a cache trigger event (704). Possible cache trigger events include: when the number of "Used" data cells in the RAM level 1 cache exceeds a preset value, the local LFS disk is idle, or the RAM level 1 cache is full (704). After the cache flush trigger event, all of the buffer blocks in the RAM level 1 cache with "Used" data cells transfer the data in the buffer blocks to the LFS disk level 2 cache (706). Once the data transfer is complete (706), all of the RAM level 1 cache buffer blocks and data cells that had data transferred to the LFS disk level 2 cache are emptied (708), thus ending the level 1 cache flush process (710). It should be noted that the cache process can operate in an optimizing fashion using the Least Recently Used (LRU) algorithm to determine the least used buffer blocks and only flushing the least used buffer blocks.

Figure 8:
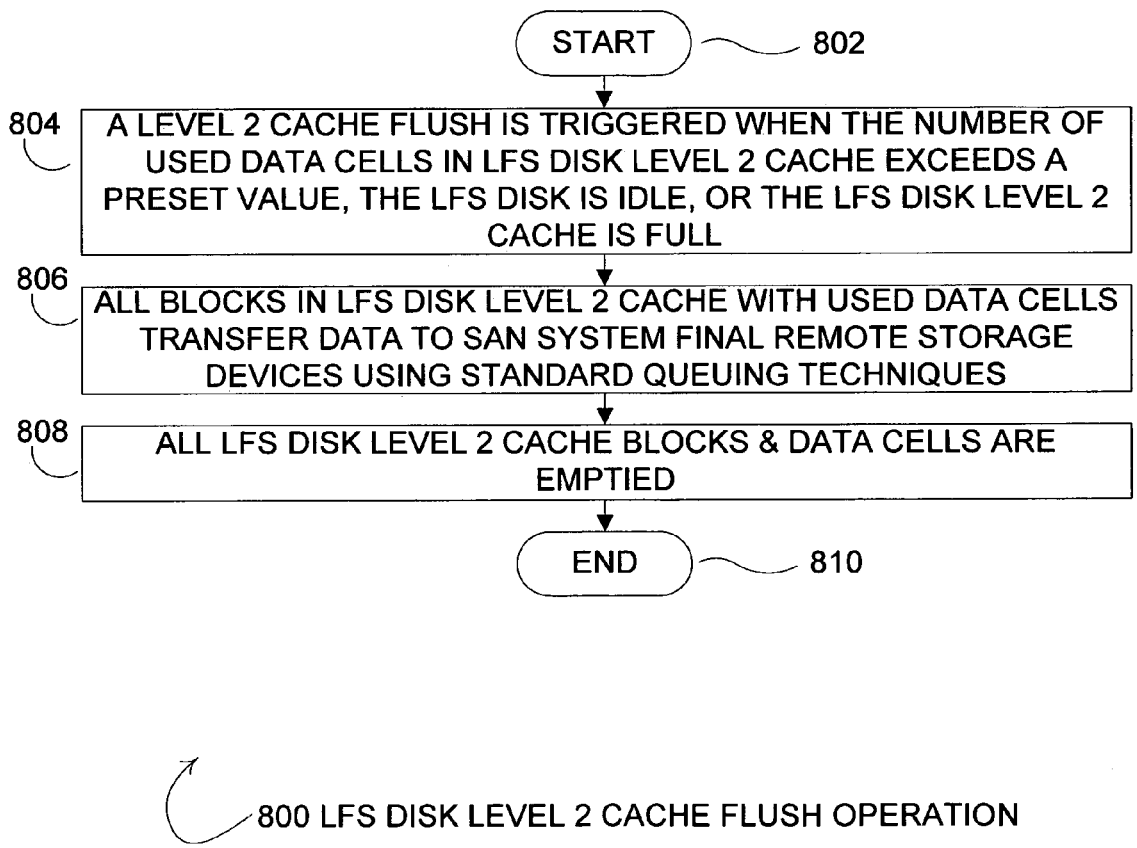
FIG. 8 is a flowchart describing the process for a level 2 flush of LFS disk level 2 cache for an embodiment of a RAID device with a 2-level cache system.

FIG. 8 is a flowchart (800) describing the process for a level 2 flush of LFS disk level 2 cache for an embodiment of a RAID device with a 2-level cache system. To start (802), a level 2 cache flush is triggered by a cache trigger event (804). Possible cache trigger events include: when the number of "Used" data cells in the LFS disk level 2 cache exceeds a preset value, the local LFS disk is idle, or the LFS disk level 2 cache is full (804). After the cache flush trigger event, all of the blocks in the LFS disk level 2 cache with "Used" data cells transfer the data in the LFS disk level 2 cache blocks to the SAN system final remote storage devices (806). The process of sending the data to the remote storage devices uses standard queuing techniques such as Last Write First Out (LWFO) (806). Once the data transfer is complete (806), all of the LFS disk level 2 cache blocks and data cells that had data transferred to the remote storage devices are emptied (808), thus ending the level 2 cache flush process (810). It should be noted that the cache process can operate in an optimizing fashion using the least recently used algorithm to determine the least used buffer blocks and only flushing the least used buffer blocks.

The present invention therefore provides increased data integrity and reliability, as well as less fragmentation of the data frame, for communications with remote storage devices in a SAN system. The increased performance is due to data caching being done at the RAM and disk level instead of data being sent directly to the transmit buffer. The 2-level cache system delays data transmissions until there is system idle time, thus, providing efficient bandwidth utilization of SAN communications as well as improved resource allocation at the RAID controller level. The 2-level cache system can avoid transmissions across the SAN communication link, thus, freeing RAID controller resources for other purposes when the data frames do not need to be transmitted. The level 2 cache on the log-structured file system disk records a timestamp of each entry in the level 2 cache, making data recovery after a system malfunction faster and easier.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for buffering storage area network communications in a RAID controller to increase overall data reliability, integrity, and communication efficiency for a storage area network system comprising the steps of:

accepting written data, said written data being small data fragments sent to said RAID controller as write requests, said write requests being a part of said storage area network communications;

storing said written data in a RAM level 1 cache, said RAM level 1 cache being a RAM level 1 data structure contained in random access memory of said RAID controller;

coalescing said written data in order to create larger written data blocks as said written data is sent to said RAID controller; and sequentially storing said written data blocks to a LFS disk level 2 cache when each of said written data blocks in said RAM level 1 cache is full, said LFS disk level 2 cache being a LFS disk level 2 data structure stored on a portion of a local hard disk drive associated with said RAID controller, said portion of said local hard disk drive formatted in log-structured file system format.

2. The method of claim 1 further comprising the step of recording a timestamp for each of said written data blocks in said LFS disk level 2 cache when each of said written data blocks is stored in said LFS disk level 2 cache.

3. The method of claim 1 further comprising the steps of:
flushing said RAM level 1 cache when optimum for storage area network system operation by transferring all said written data blocks in said RAM level 1 cache to said LFS disk level 2 cache; and
flushing said LFS disk level 2 cache when optimum for storage area network system operation by transferring all said written data blocks in said LFS disk level 2 cache to final target storage devices of said storage area network system.

4. The method of claim 1 further comprising the step of using a least recently used algorithm to determine which of said written data blocks to transfer from said RAM level 1 cache to said RAM level 2 cache in order to optimize read and write access speed for said storage area network system.

5. The method of claim 1 wherein said LFS disk level 2 data structure further comprises:
at least one block data structure, said block data structure further comprising:
at least one level 2 cache data cell of a preset size to store said written data; and
a block header data structure, said block header data structure further comprising:
a block identification number to identify each instance of said block data structure;
a level 2 cache buffer identification number to link said block data structure to said RAM level 1 data structure;
a level 2 cache cell status lookup table to store a utilized status for each said level 2 cache data cell;
a level 2 cache cell LBA lookup table to store a logical block address of said written data stored in each said level 2 cache data cell; and
a last written timestamp value to store a time value when each instance of said block data structure last stored said written data.

6. The method of claim 5 wherein said RAM level 1 data structure further comprises:
a RAM header to hold a copy of each block header for each instance of said block data structure in said LFS disk level 2 cache; and
at least one block buffer data structure, said block buffer data structure further comprising:
a level 1 cache data cell for each said level 2 cache data cell in said block data structure to store said written data, said level 1 cache data cell being equal in size to said level 2 cache data cell; and
a block buffer header data structure, said block buffer header data structure further comprising:
a buffer status value to indicate whether said written data contained in each instance of said block buffer data structure has been stored in said LFS disk level 2 cache;
a level 1 cache buffer identification number to link said block buffer data structure to said LFS disk level 1 data structure and to identify each instance of said block buffer data structure;
a level 1 cache cell status lookup table to store a utilized status for each said level 1 cache data cell;
a level 1 cache cell LBA lookup table to store a logical block address for said written data stored in each said level 1 cache data cell.

7. The method of claim 6 further comprising the steps of:
starting with said RAM level 1 cache empty and said LFS disk level 2 cache empty;
assigning a selected block buffer to an instance of said block buffer data structure from said RAM level 1 cache;
assigning a selected block to an instance of said block data structure from said LFS disk level 2 cache;
pairing said selected block buffer with said selected block by setting said level 2 buffer identification number of said selected block equal to said level 1 buffer identification number of said selected block buffer in said RAM header of said RAM level 1 cache;
receiving a write request command from said storage area network system on said RAID controller, said write request command containing write request data and a write request logical block address for said write request data;
searching said RAM header for said write request logical block address;
writing said write request data over old data stored in said level 1 cache data cell associated with said write request logical block address if said write request logical block address is found in said RAM header;
assigning said write request logical block address to a write request level 1 cache data cell in said selected block if said write request logical block address is not found in said RAM header, said assigning said write request logical block address to a write request level 1 cache data cell in said selected block further comprising the steps of:
determining if there is an unused level 1 cache data cell in said selected block buffer;
assigning an empty block buffer as said selected block buffer if there is not said unused level 1 cache data cell in said selected block buffer, assigning said empty block buffer as said selected block buffer further comprising the steps of:
writing the selected block buffer to said LFS disk level 2 cache;
returning the write completion status to said storage area network system for all said written data in said selected block buffer;
assigning an empty block buffer from said RAM level 1 cache as said selected block buffer;
assigning an empty block from said LFS disk level 2 cache as said selected block; and
pairing said selected block buffer with said selected block by setting said level 2 buffer identification number of said selected block equal to said level 1 buffer identification number of said selected block buffer in said RAM header of said RAM level 1 cache; and
assigning said unused level 1 cache data cell to said write request logical block address and storing said write request data in said unused level 1 cache data cell.

8. The method of claim 6 further comprising the steps of:
receiving a read request command from said storage area network system on said RAID controller, said read request command containing a read request logical block address;
searching said RAM header for said read request logical block address;

responding to said read request with read request data associated with said read request logical block address obtained from said RAM level 1 cache if said read request logical block address is found in any block buffer of said RAM level 1 cache;

responding to said read request with read request data associated with said read request logical block address obtained from said LFS disk level 2 cache if said read request logical block address is not found in any said block buffer of said RAM level 1 cache, but is found in any block of said LFS disk level 2 cache;

encapsulating said read request into a storage area network communication command in order to obtain read request data from a remote storage device on said storage area network system if said read request logical block address is not found in any block buffer of said RAM level 1 cache and said read request logical block address is not found in any block of said LFS disk level 2 cache.

9. The method of claim 6 further comprising the steps of:
detecting the occurrence of a level 1 flush trigger event;
transferring all block buffers in said RAM level 1 cache to said LFS disk level 2 cache if said level 1 flush trigger event is detected;
emptying all transferred block buffers in said RAM level 1 cache.

10. The method of claim 9 wherein said level 1 flush trigger event is any of the group comprising: a preset number of level 1 data cells of said RAM level 1 cache are used, said RAM level 1 cache is full, and said local hard disk drive of said RAID controller is idle.

11. The method of claim 6 further comprising the steps of:
detecting the occurrence of a level 2 flush trigger event;
transferring all blocks in said LFS disk level 2 cache using standard queuing techniques to said final target storage devices of said storage area network system if said level 2 flush trigger event is detected;
emptying all transferred blocks in said LFS disk level 2 cache.

12. The method of claim 11 wherein said level 2 flush trigger event is any of the group comprising: a preset number of level 2 data cells of said LFS disk level 2 cache are used, said LFS disk level 2 cache is full, and said local hard disk drive of said RAID controller is idle.

13. A RAID controller device that buffers storage area network communications to increase overall data reliability, integrity, and communication efficiency for a storage area network system comprising:
a storage area network communications port that sends and receives said storage area network communications, including write requests, said write requests contain written data, said written data being small data fragments;
a RAM level 1 cache that stores said written data, said RAM level 1 cache being a RAM level 1 data structure contained in random access memory of said RAID controller;
a data coalescing process that coalesces said written data into larger written data blocks as said written data is sent to said RAID controller; and
a LFS disk level 2 cache that sequentially stores said written data blocks as said RAID controller determines said written data blocks should be stored to said LFS disk level 2 cache, said LFS disk level 2 cache being a LFS disk level 2 data structure stored on a portion of a local hard disk drive associated with said RAID controller, said portion of said local hard disk drive formatted in log-structured file system format.

14. The RAID controller device of claim 13 further comprising a timestamp process that records a timestamp for each of said written data blocks in said LFS disk level 2 cache when each of said written data blocks is stored in said LFS disk level 2 cache.

15. The RAID controller device of claim 13 further comprising a read request process that accepts read requests for said written data contained in said RAM level 1 cache and said LFS disk level 2 cache from said storage area network communication port, and delivers said written data in response to said read requests as read request reply commands through said storage area network communication port.

16. The RAID controller device of claim 13 further comprising:
a level 1 cache flush process that flushes said RAM level 1 cache when optimum for storage area network system operation by transferring all said written data blocks in said RAM level 1 cache to said LFS disk level 2 cache; and
a level 2 cache flush process that flushes said LFS disk level 2 cache when optimum for storage area network system operation by transferring all said written data blocks in said LFS disk level 2 cache to final target storage devices of said storage area network system.

17. The RAID controller device of claim 13 further comprising a least recently used process that implements a least recently used algorithm to determine which of said written data blocks to transfer from said RAM level 1 cache to said RAM level 2 cache in order to optimize read and write access speed for said storage area network system.

18. The RAID controller device of claim 13 further comprising a localized communication process that localizes communication handshaking operations for said written data contained in said RAM level 1 cache and said LFS disk level 2 cache to reduce overall storage area network communications bandwidth consumption.

19. The RAID controller device of claim 13 wherein said LFS disk level 2 data structure further comprises:
at least one block data structure, said block data structure further comprising:
at least one level 2 cache data cell of a preset size to store said written data; and
a block header data structure, said block header data structure further comprising:
a block identification number to identify each instance of said block data structure;
a level 2 cache buffer identification number to link said block data structure to said RAM level 1 data structure;
a level 2 cache cell status lookup table to store a utilized status for each said level 2 cache data cell;
a level 2 cache cell LBA lookup table to store a logical block address of said written data stored in each said level 2 cache data cell; and
a last written timestamp value to store a time value when each instance of said block data structure last stored said written data.

20. The RAID controller device of claim 19 wherein said RAM level 1 data structure further comprises:
a RAM header to hold a copy of each block header for each instance of said block data structure in said LFS disk level 2 cache; and at least one block buffer data structure, said block buffer data structure further comprising:
- a level 1 cache data cell for each said level 2 cache data cell in said block data structure to store said written data, said level 1 cache data cell being equal in size to said level 2 cache data cell; and
- a block buffer header data structure, said block buffer header data structure further comprising:
  - a buffer status value to indicate whether said written data contained in each instance of said block buffer data structure has been stored in said LFS disk level 2 cache;
  - a level 1 cache buffer identification number to link said block buffer data structure to said LFS disk level 1 data structure and to identify each instance of said block buffer data structure;
  - a level 1 cache cell status lookup table to store a utilized status for each said level 1 cache data cell;
  - a level 1 cache cell LBA lookup table to store a logical block address for said written data stored in each said level 1 cache data cell.

* * * * *